United States Patent Office 3,679,652
Patented July 25, 1972

3,679,652
OLEFIN POLYMERIZATION CATALYST
AND PROCESS
Arthur William Anderson, Windsor Hills, Wilmington, and William Lawrence Truett, Mayfield, Wilmington, Del., assignors to E. I. du Pont de Nemours and Company, Wilmington, Del.
No Drawing. Filed May 15, 1956, Ser. No. 584,887
Int. Cl. C08f 1/38, 3/06
U.S. Cl. 260—94.9 B     3 Claims

ABSTRACT OF THE DISCLOSURE

Alpha-olefins are polymerized with a catalyst prepared by reacting a metal above hydrogen in the electromotive series with a transition metal halide. The character of the polymer and the yield are dependent upon the fineness of the metal component, which should be below 10 microns.

This invention relates to polymeriztaion of alpha olefins, such as ethylene, propylene and the like.

It has been known for several years that ethylene can be polymerized in the presence of certain metal halides such as $TiCl_4$-$AlCl_3$ mixtures, in combination with a combination with a component which serves as a hydrogen chloride acceptor, such as aluminum metal. Prior to the present invention, it was not recognized that the metallic component served any function requiring that it be very finely divided, i.e. that it have a particle size less than 10 microns.

The present invention is based on the discovery that the character of the polymer, and the yield is dependent upon the fineness of subdivision of the metal component.

The polymerization catalysts employed in the practice of this invention comprise a transition metal halide (the transition metal being preferably titanium, vanadium, zirconium, molybdenum, or chromium) and a metal component, said metal having a particle size less than 10 microns, and being above hydrogen in the electromotive series. Especially effective are the alkali metals, alkaline earth metals, iron, aluminum, beryllium, and manganese. Mixtures of these metals may be employed if desired. It is not essential to introduce any other reducing agent, metal alkyl, or the like, into the reaction mixture.

The polymerization is generally performed in the presence of an inert organic solvent medium, such as a normally liquid hydrocarbon. The metal may be admixed with the hydrocarbon, after which the olefin and metal halide are introduced in any order. Moisture and reactive gases such as oxygen, carbon dioxide, etc., should not be present.

The polymerization takes place over a very wide range of temperatures and pressures. Temperatures as high as 250°, or higher, may be employed, but generally much lower temperatures, e.g., as low as 25° C., are effective. Refrigeration temperatures may be employed, but this is generally not desirable. The pressure of the olefin is not highly critical, and may be atmospheric, superatmospheric or subatmospheric. Generally, there is no advantage employing pressures in excess of about 200 atmospheres, and good results are in fact obtained at pressures as low as one atmosphere. Temperatures below about 100° are sometimes preferred when it is desired to produce a slurry of the hydrocarbon polymer, but when a solution is desired (and this is frequently advantageous) temperatures should generally be above 100° C.

The invention is illustrated further by means of the following examples.

EXAMPLE 1

Aluminum dust, having a particle size of about 5 microns (weight, 0.3 gram) was suspended in 100 ml. n-heptane, and 6.0 grams titanium tetrachloride was added. The vessel was flushed with nitrogen. Ethylene was then introduced into the mixture, while maintaining the pressure at about 500 to 900 pounds per square inch, and the temperature at 27° to 160° C. Reaction took place much more rapidly as the temperature was raised to 150° C. About one hour after the temperature reached 150°, the reaction had to be stopped because the entire vessel (325 cc. capacity) was filled with polyethylene.

EXAMPLE 2

Into a 450 cc. stainless steel pressure bomb #1, cooled in a mixture of solid carbon dioxide and acetone, were added 126 grams of propylene and 56 grams of ethylene. To another (#2) silver-lined 450 cc. pressure bomb was added a slurry made by milling 0.5 gram magnesium powder in a steel rod mill overnight in 100 cc. of cyclohexane in the absence of oxygen and water, giving a particle size less than 5 microns. To this slurry, 0.5 gram of titanium tetrachloride was added, forming the catalyst. The two bombs were connected by a stainless steel tube containing a cut-off valve. Bombs #1 and #2 were heated to 110° C. and #2 bomb containing catalyst was pressured to 1000 p.s.i. by opening the valve and then immediately closing it. Bomb #2 was held at 110° C. and 470–1000 p.s.i. for 18½ hours by repressuring from #1 bomb when pressure in #2 became low.

The solid polymer which was removed from the reaction bomb was boiled with ethanol, collected by filtration and dried under vacuum. The weight of solid, elastomeric material was 102 grams. The polymer was stirred with 2 liters of boiling benzene for three hours and allowed to stand overnight at room temperature. After heating and stirring for three more hours at benzene reflux, the hot solution was filtered through glass wool. Addition of ethanol to filtrate precipated polymer which was filtered and dried. The elastomeric material amounted to 80.5 grams. Infrared analysis showed 40.2% propylene, by weight.

EXAMPLE 3

A series of experiments was performed substantially as in Example 2, with the following results.

TABLE.—EFFECT PRODUCED ON YIELD AND POLYMER PROPERTIES BY VARYING THE STARTING MATERIALS OF THE EXAMPLE, THE REACTION CONDITIONS BEING SUBSTANTIALLY CONSTANT

| Catalyst | | | | Yield, | |
|---|---|---|---|---|---|
| | Grams | Grams | Olefins | (total solid) | Properties |
| Al | 3 | 2 TiCl$_4$ | $C_2H_4$, $C_3H_6$___ 1:1 | 97 | Same.[1] |
| Fe | 4 | TiCl$_4$ | 2 $C_3H_6$ | 67 | Do. |
| Al | 3 | VCl$_4$ | 2 $C_3H_6$ | 67 | Do. |
| Mg | 2 | VCl$_4$ | 2 $C_3H_6$ | 81 | Do. |
| Mg | 2 | WCl$_6$ | 2 $C_2H_4$, $C_3H_6$___ 2:3 | 33 | Do. |
| Mg | 1 | TiCl$_4$ | 1 $C_3H_6$ | 117 | Do. |
| Mg | 2 | TiCl$_4$ | 2 $C_3H_6$ | 116 | Do. |
| Mg | 1 | TiCl$_4$ | 1 $C_2H_4$ | 50 | Granular. |
| Fe[2] | 4 | TiCl$_4$ | 2 $C_2H_4$, $C_3H_6$___ 1:1 | 0 | |
| Mg[2] | 2 | TiCl$_4$ | 2 $C_3H_6$ | 6.5 | |
| Mg | 2 | None | 2 $C_3H_6$ | 0 | |
| None | | TiCl$_4$ | 2 $C_2H_4$, $C_3H_6$___ 2:3 | 13 | Waxy. |

[1] Qualitatively similar to the tough, rubber polymer of Example 2: Quantitatively, there are differences in propylene content, intrinsic viscosity, etc.
[2] Metal not milled.

NOTE.—In corresponding experiments, chromium and zirconium halides have given catalysts producing waxy rather than elastomeric polymers.

EXAMPLE 4

Into a reactor was charged 4.36 grams of molybdenum pentachloride, 6.64 grams of finely divided titanium (below 10 microns in particle size) and 100 ml. of cyclohexane. The reaction mixture was maintained at 99–100° C. over a 16-hour period under an ethylene pressure of 2500 lb./sq. in. The recovered solid polymer was purified and separated into fractions by successive benzene and xylene extractions as described above. There was obtained 11.5 grams of wax and 6.0 grams of high molecular weight solid polyethylene. In addition there remained 3.9 grams of polymer which was insoluble in boiling xylene.

EXAMPLE 5

Into a pressure resistant vessel was placed 125 cc. cyclohexane, 5.0 grams manganese dust (less than 10 microns in particle size), and 5.1 grams TiCl$_4$; ethylene was injected under a pressure of 2500 pounds per square inch. After 3 hours at 225° C., the resulting mixture contained 20 grams of polyethylene. An experiment performed under very similar conditions using manganese turnings in place of manganese dust gave no polyethylene whatever.

EXAMPLE 6

Into a pressure resistant vessel was placed 5.0 grams of finely divided beryllium, containing particles of diameter less than 10 microns, 125 cc. cyclohexane, and 5.1 grams of titanium tetrachloride. Ethylene was introduced at a pressure of 2500 pounds per square inch. After 3 hours at 225° C. the mixture contained 17.5 grams of polyethylene.

EXAMPLE 7

Into a dispersion of 1.5 grams of sodium and 2.0 grams TiCl$_4$ in 100 cc. heptane at 150 to 190° C. was injected ethylene under a pressure of 1600 to 2800 pounds per square inch. The resulting product, after washing with alcohol, yielded 30 grams of polyethylene.

In experiments somewhat similar to those described above, zinc-mercury couple (6.3 grams) with TiCl$_4$ (3.4 grams) gave 12.3 grams of polyethylene. In a parallel experiment zinc-copper couple with TiCl$_4$ gave 5.9 grams polyethylene. Calcium (4 grams) with TiCl$_4$ (5.1 grams) gave only one gram of polyethylene, in an experiment at 225°, the pressure being 2500 pounds per square inch; in the latter instance the calcium was introduced in the form of turnings. The following metals in the form of coarse powder or granules were tested with TiCl$_4$, but gave no substantial yield of polyethylene: antimony, iron, nickel, cobalt, copper, tin, manganese, molybdenum, tungsten, chromium, bismuth, and cadmium.

The process of this invention, as illustrated in the foregoing examples is well suited for the manufacture of ethylene/propylene interpolymers having propylene as the preponderant component. This is an important advantage of this process, as compared with prior art processes using, for example, supported metal oxides as polymerization catalysts, since the latter processes, as heretofore disclosed, give rise to polymers which invariable contain a very high proportion, by weight, of ethylene, when ethylene and higher olefins such as propylene are initially present.

Other comonomers, or mixtures of comonomers, may also be used. For example, good results are obtained in the polymerization of ethylene with propylene and a third comonomer such as hexene-1. The alpha olefins which may be employed in the practice of the invention are not limited to mono-olefins, but include also alkadienes, alkatrienes, etc.

The polyethylene or other alpha olefin polymer obtained as described in the foregoing illustrations can be washed free of solvent by means of an alcohol, following which the product can be very readily dried. This procedure eliminates at least a part of the catalyst residues. Polyethylene thus obtained is a normally solid polymer, suitable for use in films, fibers, coatings, molded objects, etc. the ethylene/propylene interpolymers are also useful for these purposes, and are especially valuable as elastomer intermediates (excellent elastomers being obtained therefrom by chlorosulfonation).

The term "particle size" as used herein means the maximum dimension, or diameter, of the particle. Particles of minute size can be obtained by means of a hammer mill. Certain metals are obtainable commercially in the form of particles of extremely small size—so small indeed that these metals ignite spontaneously in air. Aluminum of such minute particles size can be obtained, and is extremely reactive in this form. The same is true of other metals including those which are apparently stable in air when the size of the particle is above 10 microns.

While all of the metals above hydrogen in the electromotive series are active in the process hereinabove described, the metals which are most surprisingly active are those of Group IIb (magnesium, beryllium, zinc), Group IIIb (aluminum), Group IVa (titanium), Group VIIa (manganese), and Group VIII (iron).

The most active metals, such as sodium are, relatively, quite effective even when not in an extremely fine state of subdivision (less than 10 microns), but fineness of subdivision is nevertheless desirable even in such metals as sodium. As shown in Example 7, sodium is active in the state of subdivision which results from very vigorous agitation of the molten metal in a liquid hydrocarbon medium. Metals other than these most active ones can be used in ordinary finely divided form, but the results are relatively poor when the particle size in these other metals is above 10 microns.

The prior art (cf. U.S. Pat. 2,355,925, Aug. 15, 1944, Reid) gave rise to entirely different results when ordinary forms of sodium were used. Moreover, when ordinary forms of such metals as aluminum powder, iron, zinc, were employed heretofore, the prior art taught that aluminum trichloride had to be used, along with titanium tetrachloride, to suppress the formation of liquid polymers, and bring about the production of solid polymers (cf. German Pat. 874,215, Ausgegeben Am Apr. 20, 1953, Fischer). The present invention is, of course, not concerned with the type of process in which metallic sodium in "finely divided" form is employed for preparing mono-olefin-diene polymers in the presence of Friedel-Crafts catalysts at temperatures below minus 75° C. (as disclosed in U.S. patent to Reid 2,427,303, Sept. 9, 1947). The present invention is thus distinguished from these earlier disclosures and teachings, which concern processes other than what is intended to be covered by the following claims.

What is claimed is:

1. A process for the production of a solid polyethylene polymer which comprises contacting ethylene with a polymerization catalyst consisting of a mixture of titanium tetrachloride and metallic aluminum to produce a solid polyethylene polymer.

2. A process for the production of solid polymer from ethylene in the presence of an inert organic liquid medium, which comprises contacting said ethylene with a polymerization catalyst consisting of the mixture obtained by admixing titanium tetrachloride and aluminum dust, said aluminium having a particle size of less than 10 microns, to produce a solid polymer of said ethylene.

3. A process for the production of a solid polyethylene which comprises (1) reducing titanium tetrachloride with aluminum and (2) contacting ethylene with a catalyst consisting of the product of step (1).

References Cited

UNITED STATES PATENTS

| | | | |
|---|---|---|---|
| 2,899,416 | 8/1959 | Schreyer | 260—94.9 |
| 2,899,418 | 8/1959 | Reynolds. | |
| 2,962,451 | 11/1960 | Schreyer | 252—42 |
| 2,905,645 | 9/1959 | Schreyer. | |
| 2,893,984 | 7/1959 | Scelbach et al. | |

FOREIGN PATENTS

| | | |
|---|---|---|
| 874,215 | 4/1953 | Germany. |

OTHER REFERENCES

Encyclopedia of Chemical Technology by Kirk et al., Interscience Encyclopedia Inc., vol 14, p. 194.

JOSEPH L. SCHOFER, Primary Examiner

E. J. SMITH, Assistant Examiner

U.S. Cl. X.R.

252—441, 442; 260—80.78, 88.2, 93.7, 94.3